Dec. 31, 1935.  J. W. WHITE  2,026,263
BRAKE DRUM
Filed Sept. 16, 1931  2 Sheets-Sheet 1
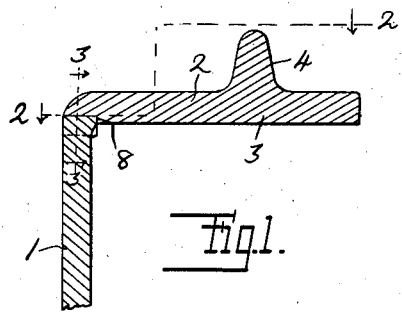
fig.1.
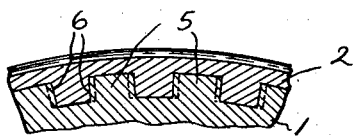
fig.3.
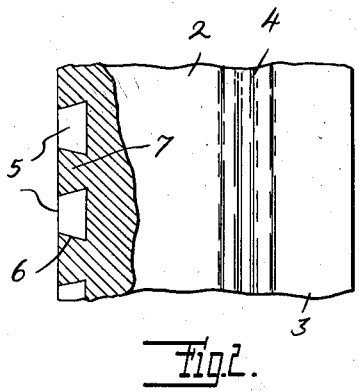
fig.2.
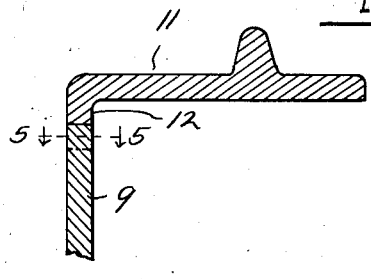
fig.4.
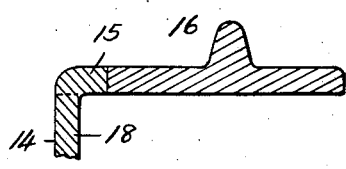
fig.5.
fig.6.
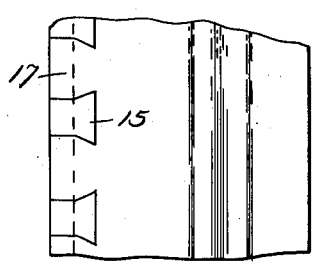
fig.7.
INVENTOR
John William White
BY
Whittemore Hulbert Whittemore & Belknap
ATTORNEYS Dec. 31, 1935.   J. W. WHITE   2,026,263
BRAKE DRUM
Filed Sept. 16, 1931   2 Sheets-Sheet 2
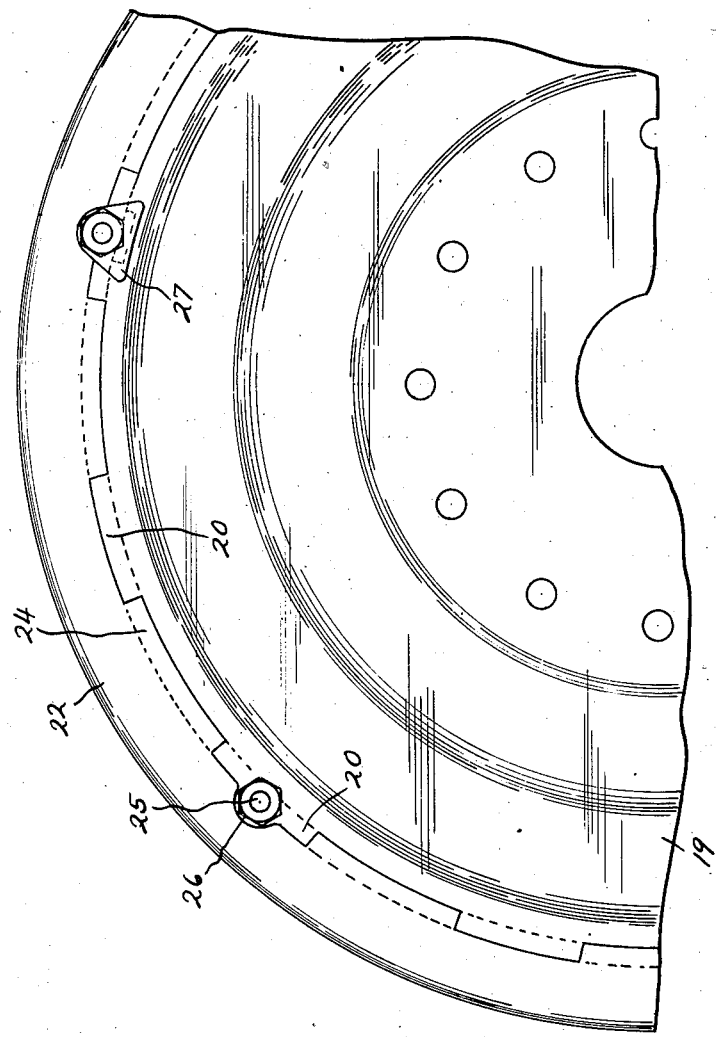
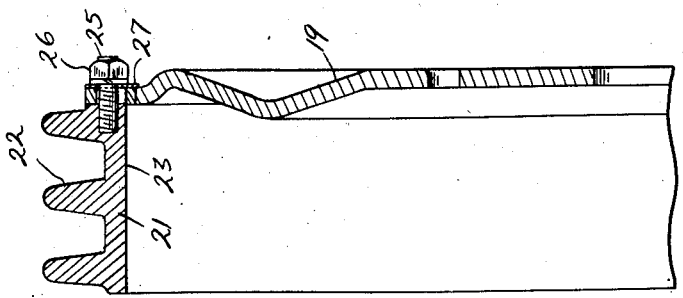
INVENTOR
John William White
BY
Whittemore Hulbert Whittemore Belknap
ATTORNEYS Patented Dec. 31, 1935

2,026,263

UNITED STATES PATENT OFFICE 2,026,263

BRAKE DRUM

John William White, Detroit, Mich., assignor, by mesne assignments, to The Kelsey-Hayes Wheel Company, Detroit, Mich., a corporation of Delaware Application September 16, 1931, Serial No. 563,195

12 Claims. (Cl. 188—218)

The invention relates to brake drums and refers more particularly to composite brake drums for use with motor vehicles. One of the objects of the invention is to provide a brake drum having a backing member and an annular flange member with an improved mounting on the former for the latter. Another object is to so mount the annular flange member on the backing member that the former is interlocked with and held from axial disengagement from the latter, but may expand radially. These and other objects of the invention will become apparent from the following description, taken in connection with the accompanying drawings, in which Figure 1 is a radial section through a portion of a brake drum showing an embodiment of my invention;

Figures 2 and 3 are cross sections, respectively, on the lines 2—2 and 3—3 of Figure 1;

Figures 4, 6, and 8 are views similar to Figure 1 showing other embodiments of my invention;

Figure 5 is a cross section on the line 5—5 of Figure 4;

Figure 7 is a plan view of Figure 6;

Figure 9 is an elevation of Figure 8.

The brake drum, as shown in Figures 1, 2, and 3, comprises the radially extending sheet metal backing member 1 and the annular flange member 2, which is formed of cast metal. This annular flange member has the axially extending body 3 forming the brake engaging member and is suitably reinforced as by means of the outwardly extending annular rib 4, which latter also serves in cooling the brake drum.

The backing member 1 is circular and is provided at its periphery with the spaced axially extending dove-tailed projections 5 which taper in width from their front to their rear edges and each of which has its opposite sides 6 extending parallel to the radial plane passing axially through its center. The annular flange member 2 has at its rear edge and projecting from its inner surface the cooperating axially extending dove-tailed projections 7 fitting the projections 5 and located in the recesses therebetween, the annular flange member also having between the projections 7 recesses into which the projections 5 fit. The annular flange member has the radially extending shoulder 8 formed between each pair of adjacent projections 7 for preventing axial disengagement of the annular flange member from the backing member by a movement of the former in a rearward direction, the dove-tailed projections 5 and 7 preventing axial separation in the opposite direction.

The annular flange member is assembled with the backing member preferably by casting the annular flange member upon the backing member under pressure greater than that produced by the weight of the material forming the annular flange member, so that the mold in which the annular flange member is formed will be completely filled, assuring properly forming the annular flange member. In this connection it is to be noted that the annular flange member is cast upon the backing member when the latter is cool so that fusing of the flange with the backing member is prevented and radial expansion of the annular flange member is unrestricted.

In the modification shown in Figures 4 and 5 the backing member 9 is preferably formed of sheet metal and extends radially and is circular and has at its periphery the axially extending dove-tailed projections 10 with alternate projections tapering in width axially of the brake drum in opposite directions. The opposite sides of these projections extend parallel to the radial plane passing axially through the centers of the respective projections. The annular flange member 11 has at the rear edge of its body the radially inwardly extending annular flange 12 which is formed with the projections 13 fitting between the projections 10 and providing recesses for receiving these latter projections. The annular flange member is cast upon the backing member. In this construction the cooperating projections and recesses, alternate ones of which are tapered in width in opposite directions, serve to hold the annular flange member from axial movement in either direction relative to the backing member.

In the modification shown in Figures 6 and 7, the backing member 14 is preferably formed of sheet metal and is circular and has at its periphery the spaced transverse or axially extending projections 15 formed by bending over the same. These projections taper in width from their front to their rear edges and each has its opposite sides parallel to the radial plane passing axially through its center. The annular flange member 16 has at the rear edge of its body the cooperating projections 17 and recesses for fitting the projections 15 and the projections 17 overlap the body portion 18 of the backing member. This annular flange member is also cast upon the backing member.

As shown in Figures 8 and 9, the backing member 19 is preferably formed of sheet metal and is circular and has at its periphery the spaced radially extending projections or splines 20, the opposite sides of each of which extend parallel to the radial plane passing through their respective centers. The annular flange member 21 is preferably formed of cast metal and has the annular encircling ribs 22 providing rigidity and heat radiation and the inner cylindrical brake engaging face 23. This annular flange member has at the rear edge of its body the radially extending cooperating projections or splines 24 for fitting in the recesses between the projections or splines 26, the latter fitting in the recesses between the projections or splines 24. To secure the annular flange member to the backing member, I provide the axially extending studs 25, which are threaded into the body of the annular flange member and extend freely through certain of the projections or splines 26, and the nuts 26 threaded upon these bolts, the washers 27 being preferably located between the nuts and the backing member. The bolt holes in the projections or splines 26 are elongated radially and the nuts are tightened down sufficiently to hold the annular flange member and backing member together without play, but allow radial expansion of the annular flange member.

From the above description, it will be readily seen that the annular flange member may be formed of suitable material to provide a brake engaging member having a good wearing surface. It will also be seen that the mounting for the annular flange member upon the backing member is such that the annular flange member is held from disengagement from the backing member in both axial directions and that the annular flange member may expand radially relative to the backing member and is accurately centered thereon at all times.

What I claim as my invention is:

1. A brake drum, comprising a backing member and a continuous annular flange member permanently fixed on and having a dove-tailed connection with said backing member preventing relative movement of said members in an axial direction and providing for radial expansion of said flange member relative to said backing member.

2. A brake drum, comprising a backing member and a continuous annular flange member mounted on and having an axially extending inter-locking permanent connection with said backing member preventing relative movement of said members in an axial direction and providing for relative expansion and contraction of said members in a radial direction.

3. A brake drum, comprising a backing member and a continuous annular flange member mounted on and having an axially extending permanent dove-tailed connection with said backing member preventing relative movement of said members axially of the drum and providing for relative expansion and contraction of said members in a radial direction.

4. A brake drum, comprising a backing member and an annular flange member mounted on said backing member, said backing and flange members having interfitting dove-tailed projections and recesses providing for radial expansion of said flange member relative to said backing member, each projection tapering in width axially of the brake drum and having its opposite sides extending substantially parallel to a radial plane.

5. A brake drum, comprising a backing member and a continuous annular flange member mounted on said backing member, said backing member having peripheral axially extending dove-tailed projections and said flange member having co-operating inwardly extending dove-tailed projections on its inner face for holding said web and flange members from axial movement in one direction, and a shoulder cooperating with said backing member for holding said backing and flange members from axial movement in the opposite direction.

6. A brake drum, comprising a backing member and an annular flange member mounted on said backing member, said backing and flange members having cooperating dove-tailed projections and recesses for securing the two together, certain of said projections tapering in width in one direction and certain other of said projections tapering in width in the opposite direction.

7. A brake drum, comprising a backing member and an annular flange member mounted on said backing member, said backing and flange members having cooperating axially extending dove-tailed projections and recesses for securing the two together, the alternate projections tapering in width in opposite directions.

8. A brake drum, comprising a radially extending backing member having at its periphery transversely extending dove-tailed projections and a continuous annular flange member overlapping said backing member and having recesses for receiving said projections preventing relative movement of said members axially of the drum and providing for relative expansion and contraction of said members in a radial direction.

9. A brake drum, comprising a backing member and an annular flange member having cooperating projections and recesses with their opposite sides extending substantially parallel to radial planes passing through their centers providing for relative expansion and contraction of said members in radial directions.

10. A brake drum, comprising a backing member, an annular flange member cast upon the backing member, and means permanently connecting the latter to the former arranged to provide for radial expansion of the latter relative to the former.

11. A brake drum, comprising a backing member and an annular flange member cast upon the backing member and having a permanent axially extending interlocking connection with said backing member providing for radial expansion of the annular flange member relative to the backing member.

12. A brake drum, comprising a backing member and a continuous annular flange member mounted on and having an axially extending dove-tailed connection with said member arranged to provide for radial expansion of the annular flange member relative to the backing member.

JOHN WILLIAM WHITE.